(12) United States Patent
Marin et al.

(10) Patent No.: US 7,014,458 B2
(45) Date of Patent: Mar. 21, 2006

(54) HIGH VELOCITY INJECTION OF ENRICHED OXYGEN GAS HAVING LOW AMOUNT OF OXYGEN ENRICHMENT

(75) Inventors: Ovidiu Marin, Lisle, IL (US); Benjamin Bugeat, Oak Park, IL (US); Eric Streicher, Downers Grove, IL (US); Pietro Di Zanno, Malmaison (FR)

(73) Assignees: American Air Liquide, Inc., Fremont, CA (US); L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/730,720

(22) Filed: Dec. 8, 2003

(65) Prior Publication Data

US 2004/0115576 A1    Jun. 17, 2004

Related U.S. Application Data

(63) Continuation of application No. 09/819,197, filed on Mar. 28, 2001, now Pat. No. 6,685,464.

(51) Int. Cl.
*F23C 5/00*    (2006.01)

(52) U.S. Cl. .................. 431/10; 431/8; 431/9; 431/187; 431/173

(58) Field of Classification Search .................. 431/8, 431/9, 10, 159, 181, 187, 173; 110/345
See application file for complete search history.

(56) References Cited

U.S. PATENT DOCUMENTS

| | | | | |
|---|---|---|---|---|
| 3,890,084 A | * | 6/1975 | Voorheis et al. | 431/10 |
| 4,395,223 A | * | 7/1983 | Okigami et al. | 431/10 |
| 4,403,941 A | * | 9/1983 | Okiura et al. | 431/10 |
| 4,515,095 A | * | 5/1985 | Greskovich | 110/347 |
| 4,630,555 A | * | 12/1986 | Guillaume et al. | 110/346 |
| 4,863,371 A | * | 9/1989 | Ho | 431/9 |
| 5,000,102 A | * | 3/1991 | Ho | 110/346 |
| 5,102,330 A | * | 4/1992 | Ho | 432/14 |
| 5,107,777 A | * | 4/1992 | Mullen | 110/346 |
| 5,146,858 A | * | 9/1992 | Tokuda et al. | 110/261 |
| 5,147,438 A | * | 9/1992 | Castelain et al. | 65/134.4 |
| 5,186,617 A | * | 2/1993 | Ho | 431/9 |
| 5,195,450 A | * | 3/1993 | Marion | 110/347 |
| 5,205,227 A | * | 4/1993 | Khinkis et al. | 110/345 |

(Continued)

FOREIGN PATENT DOCUMENTS

EP    000987508 A1  *  3/2000

(Continued)

*Primary Examiner*—Carl D. Price
(74) *Attorney, Agent, or Firm*—Christopher J. Cronin

(57)    ABSTRACT

Methods and apparatus for combustion of a hydrocarbon fuel in a combustion chamber of a furnace or boiler are presented, the combustion normally using only air as an oxidant, part of the air entering the combustion chamber through one or more burners, and a remaining portion of air entering the combustion chamber at a plurality of locations downstream of the burners. The methods comprise injecting oxygen-enriched gas through a plurality of lances into the combustion chamber at a plurality of downstream locations, the oxygen-enriched gas injected at a velocity ranging from subsonic to supersonic, and the oxygen-enriched gas being present in an amount sufficient to provide an oxygen concentration of no more than 2% on a volume basis greater than when air is used alone as oxidant.

24 Claims, 7 Drawing Sheets

U.S. PATENT DOCUMENTS

| | | | |
|---|---|---|---|
| 5,242,296 A | * | 9/1993 | Tuson et al. .................. 431/10 |
| 5,252,298 A | * | 10/1993 | Jones ......................... 422/172 |
| 5,305,698 A | * | 4/1994 | Blackwell et al. .......... 110/348 |
| 5,439,373 A | * | 8/1995 | Anderson et al. ............. 431/10 |
| 5,601,425 A | * | 2/1997 | Kobayashi et al. ............. 431/8 |
| 5,674,064 A | * | 10/1997 | Francis, Jr. ..................... 431/4 |
| 6,007,326 A | * | 12/1999 | Ryan, III et al. ................ 431/9 |
| 6,314,896 B1 | * | 11/2001 | Marin et al. ................. 110/345 |
| 6,481,998 B1 | * | 11/2002 | Payne et al. .................... 431/5 |
| 6,685,464 B1 | * | 2/2004 | Marin et al. .................. 431/10 |

FOREIGN PATENT DOCUMENTS

| | | | |
|---|---|---|---|
| EP | 001037005 A2 | * | 9/2000 |
| GB | 2195175 | * | 3/1988 |
| JP | 57-102522 | * | 6/1982 |
| JP | 62-80410 | * | 4/1987 |
| JP | 06-101809 | * | 4/1994 |
| JP | 11-241810 | * | 9/1999 |

\* cited by examiner

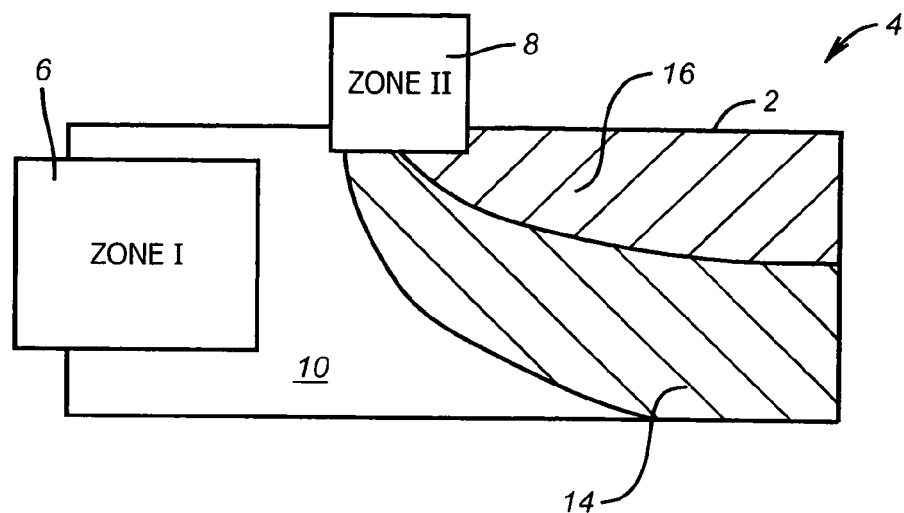
FIG. 3
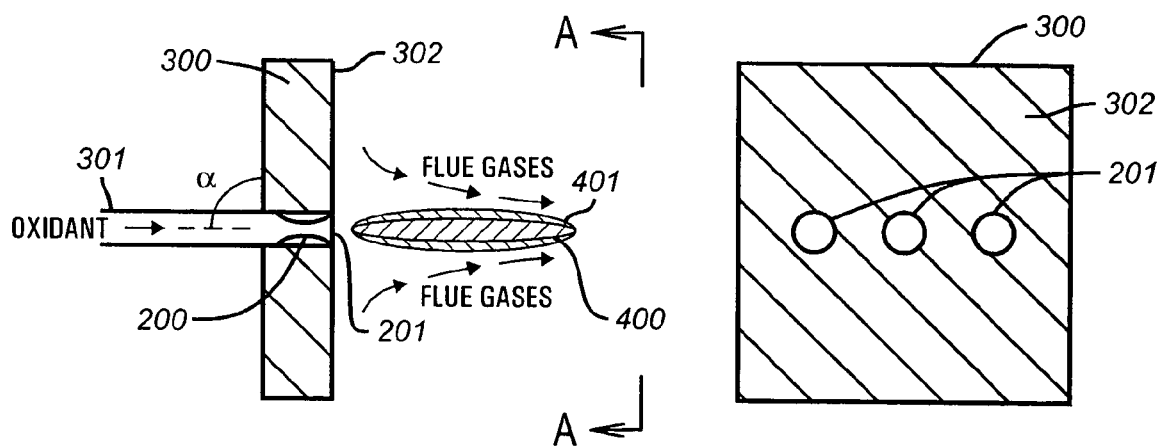
FIG. 4a  FIG. 4b

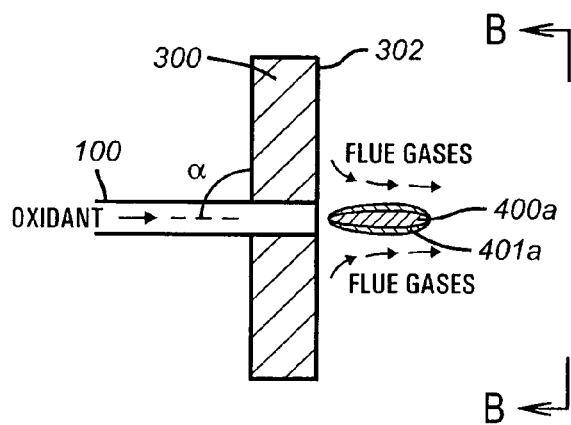
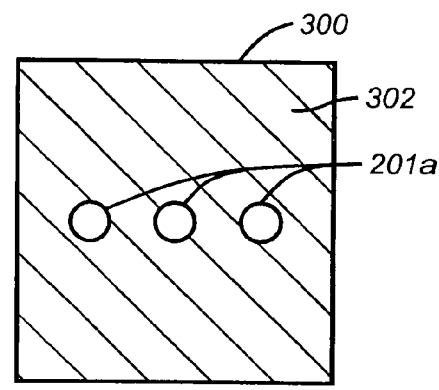
FIG. 5a  FIG. 5b
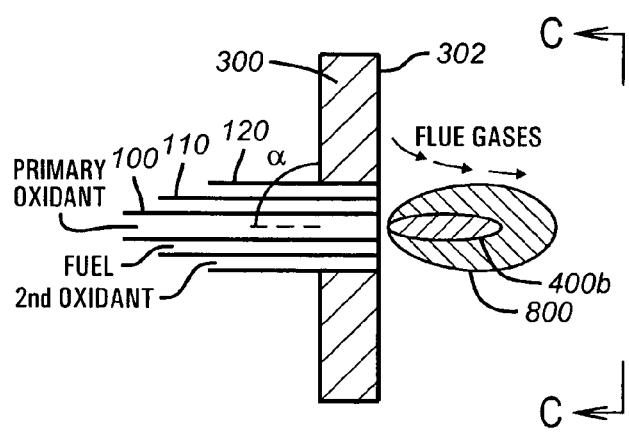
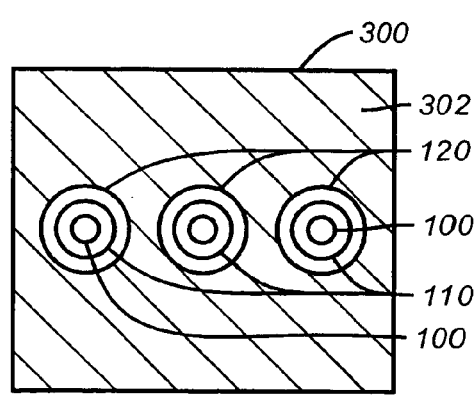
FIG. 6a  FIG. 6b

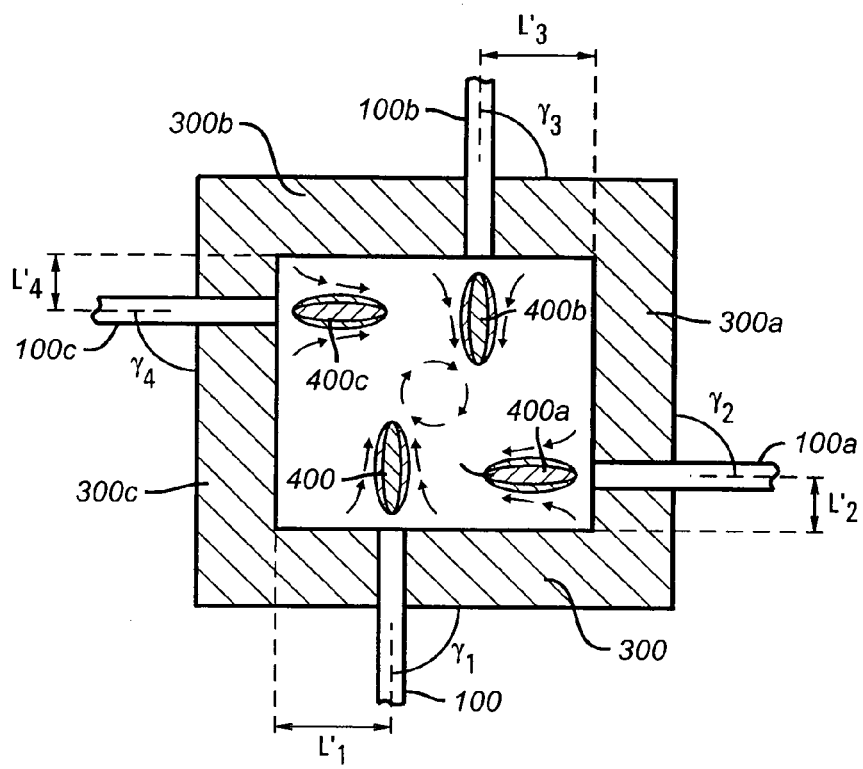
FIG. 8
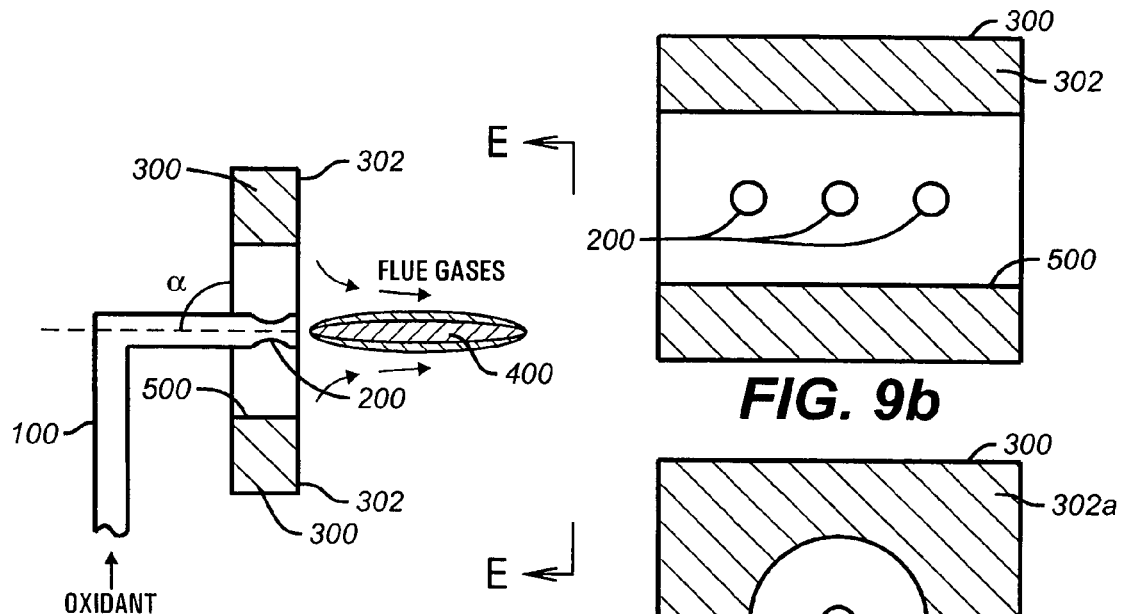
FIG. 9a
FIG. 9b
FIG. 9c

HIGH VELOCITY INJECTION OF ENRICHED OXYGEN GAS HAVING LOW AMOUNT OF OXYGEN ENRICHMENT

CROSS-REFERENCE TO RELATED APPLICATIONS

This application is a continuation of Ser. No. 09/819,197 filed Mar. 28, 2001, now U.S. Pat. No. 6,685,464 issued Feb. 3, 2004.

BACKGROUND OF THE INVENTION

1. Field of the Invention

This invention relates to oxygen enrichment in industrial heating applications, in particular in power boilers.

2. Related Art

In a previous disclosure of the same assignee of the present invention, Air Liquide Serie file 5167, filed Nov. 10, 1999, application Ser. No. 09/437,526, now U.S. Pat. 6,314,896 issued Nov. 13, 2002, there was a proposed scheme of oxygen-enrichment in boilers using large amounts of oxygen, up to full oxy-fuel combustion. That patent application involved a certain ratio between the oxygen enrichment and the flue gas recirculation, such that the design boiler parameters are maintained constant.

While quite inventive, the above-referenced methods in said patent application may not be desirous in particular industrial heating applications, in particular coal fired boilers, primarily pulverized coal, but with the application to fluidized beds also. Coal combustion results in a potentially large amount of unburned coal in the stack, thus losing a large amount of fuel. Also, due to the incomplete combustion of coal, as well as to the sometimes difficult ignition process, a support fuel such as natural gas is frequently used in significant quantities (from about 10% to about 50% of the total amount of fuel). The ease and completeness of combustion is directly related to the volatile content of the coal, and indirectly related to the percentage of moisture in the coal. In other words, more moisture means more difficult and possibly incomplete combustion, while more volatiles in the coal means more complete combustion.

FIG. 1 presents in schematic, a prior art combustion chamber 2 in a boiler 4, where the combustion chamber 2 is divided into two major zones: Zone I, as denoted in FIG. 1 at 6, represents the area where combustion burners are located, together with air inlets. Combustion air can enter combustion chamber 2 together with a fuel (part of the air is used to transport coal into combustion chamber 2), or in different inlets. Combustion air can be introduced into the boiler partially or totally at this location. More modern schemes use a different air inlet, denoted as Zone II, and noted as 8 in FIG. 1, in order to improve the combustion process and to lower the $NO_x$ emissions. The combustion scheme illustrated schematically in FIG. 1 is termed "staged combustion" since the combustion process occurs in two zones. It is noted that the schematic in FIG. I is very general, showing a generally horizontal flue gas circulation 10. In general, flue gas circulation can be in any direction (vertical, horizontal, circular, and the like).

Another aspect of the invention is a method of increasing combustion of a first hydrocarbon fuel in a combustion chamber, the combustion normally using only air as an oxidant, part of the air entering the combustion chamber through one or more first hydrocarbon fuel burners in a first zone of the combustion chamber, and a remaining portion of air normally entering the combustion chamber at a plurality of locations downstream of said first hydrocarbon fuel burners, the method comprising injecting a first oxygen-enriched gas into the combustion chamber at said plurality of locations, the first oxygen-enriched gas being in an amount sufficient to provide an oxygen concentration of no more than 2% greater than when said air is used alone, and wherein the first oxygen-enriched gas is injected through a lance at a velocity, said lance injecting said first oxygen-enriched gas into a flame created by a second oxygen-enriched gas and a second hydrocarbon fuel.

As illustrated in FIG. 1, the combustion process is divided into two major zones: Zone I represents the ignition zone, where the fuel(s) enter the combustion chamber, are heated, and ignite. When coal is of a lesser quality, additional fuel (generally natural gas or fuel oil) is required for a fast ignition. Zone II represents the final region allocated for combustion. Additional oxidant may be introduced, as mentioned supra. Modern staged combustion schemes allow a significant portion of the oxidant to enter Zone II (between 10% and 50% of the total oxidant). Due to the low pressure of the incoming air in Zone II, the flow patterns of the main flue gas stream are relatively undisturbed, thus the mixing between the two streams is relatively poor, preventing the full combustion of the fuel. This is represented by the shaded area 16 in FIG. 2. FIG. 2 illustrates that the mixing zone 16 between the flue gas stream 10 and the balance of the oxidizer in Zone II and exiting into the mixing zone 16 is not total, thus an important part of the fuel will not mix with the oxidant, thus remaining unburned.

It would be an advantage if the fuel from Zone I could be mixed with oxidant from Zone II to provide better mixing between fuel and secondary oxidant.

SUMMARY OF THE INVENTION

In accordance with the present invention, methods and apparatus are provided which overcome problems associated with the prior art methods. The present invention involves introducing a high velocity stream of an oxygen-enriched gas into Zone II through a multitude of streams, preferably uniformly distributed for better mixing. "Oxygen-enriched" as used herein, is considered any gas having concentration of oxygen higher than 21% (the oxygen concentration in air). The results of this inventive process are: providing the fuel and/or fuel-rich combustion products with enhanced oxidant (when compared to air), and also improving the mixing between the fuel and/or fuel-rich combustion products and the oxidant. The combined effect of high oxygen concentration and improved mixing leads to a more effective and complete fuel combustion.

One aspect of the invention is a method of increasing combustion of a hydrocarbon fuel in a combustion chamber of a furnace, the combustion normally using only air as an oxidant, part of the air entering the combustion chamber near (preferably in) one or more fuel burners, and a remaining portion of air entering the combustion chamber at a plurality of locations downstream of said fuel burners, the method comprising the steps of injecting oxygen-enriched gas through a plurality of lances into a flue gas in the combustion chamber at the plurality of downstream locations, the oxygen-enriched gas injected at a velocity ranging from subsonic to supersonic, the oxygen-enriched gas being present in an amount sufficient to provide an oxygen concentration in the flue gas of no more than 2% on a volume basis greater than when air is used alone as oxidant. Preferably, the velocity is subsonic for the oxygen-enriched gas in each of the plurality of lances, or in some embodiments the velocity is supersonic for the oxygen-enriched gas in each of the plurality of lances. In any case the velocity of the oxygen-enriched gas is greater than velocity of air injection.

As used herein the term "combustion chamber" includes any area where combustion of fuel can occur in a furnace or boiler.

In other preferred embodiments, some of the oxygen-enriched gas is injected at subsonic velocity in one or more lances while a balance of the oxygen-enriched gas is injected at supersonic velocity through one or more lances.

The oxygen-enriched gas is preferably injected through the lances at an angle with respect to a wall of the combustion chamber, the angle ranging from about 20° to about 160°, the angle measured in a plane that is perpendicular to the wall. Preferably, the plurality of locations are arranged so that one-half of the lances are on a first wall and one-half of the lances are on a second wall. Also preferred are embodiments where lances on the first wall are separated by distance $L_L$, wherein $L_L<L_{CH}/2$, wherein $L_{CH}$ is selected from the group consisting of height, length, and width of the combustion chamber, and wherein the lances on the first wall are positioned a distance l from the lances on the second wall, wherein $0<l<L_L/2$, wherein $L_L$ is the distance between lances on the first wall.

Preferably, the combustion chamber is rectangular, wherein there is one lance on each of four walls of the rectangular combustion chamber, and wherein each lance is a distance L' from a wall wherein an adjacent lance is positioned. Preferably, $L'<L_{CH}/2$. In this embodiment, each lance is preferably positioned at a first angle ranging from about 20° to about 160°, the first angle measured in a first plane which is substantially vertical and substantially perpendicular to its corresponding wall, and each lance is preferably positioned at a second angle ranging from about 20° to about 160°, the second angle measured in a plane substantially perpendicular to the first plane.

In the embodiments which employ rectangular combustion chambers, the remaining portion of air preferably enters the combustion chamber through one or more rectangular slots, or through one or more substantially circular slots.

Other preferred methods are those wherein the oxygen-enriched gas is injected in substitution for the remaining portion of air, and methods wherein said oxygen-enriched gas is injected into the remaining portion of air.

A second aspect of the invention is a method of increasing combustion of coal in a combustion chamber of a furnace, the combustion normally using only air as an oxidant, part of the air entering the combustion chamber near (preferably in) one or more fuel burners, and a remaining portion of air entering the combustion chamber at a plurality of locations downstream of the fuel burners, the method comprising the steps of injecting oxygen-enriched gas through a plurality of lances into a flue gas in the combustion chamber at the plurality of downstream locations, the oxygen-enriched gas injected at a velocity ranging from subsonic to supersonic, and the oxygen-enriched gas being present in an amount sufficient to provide an oxygen concentration in the flue gas of no more than 2% on a volume basis greater than when air is used alone as oxidant. As in the first aspect, the injected oxygen-enriched gas is injected at a velocity greater than the air would have been.

Preferred are those methods wherein some of the oxygen-enriched gas is injected at subsonic velocity in one or more lances while a balance of the oxygen-enriched gas is injected at supersonic velocity through one or more lances.

Also preferred are methods within this aspect wherein the oxygen-enriched gas is injected through the lances at an angle with respect to a wall of the combustion chamber, the angle ranging from about 20° to about 160°, the angle measured in a plane that is perpendicular to the wall.

Preferred embodiments with the second aspect include those methods wherein the plurality of locations are arranged so that one-half of the lances are on a first wall and one-half of the lances are on a second wall; methods wherein lances on the first wall are separated by distance L, wherein $L<L_{CH}/2$, wherein $L_{CH}$ is selected from the group consisting of height, length, and width of the combustion chamber; methods wherein the lances on the first wall are positioned a distance l from the lances on the second wall, wherein $0<l<L/2$, wherein L is the distance between lances on the first wall; methods wherein the combustion chamber is rectangular, and wherein there is one lance on each of four walls of said rectangular combustion chamber, wherein each lance is a distance L' from a wall wherein an adjacent lance is positioned; methods wherein each lance is positioned at a first angle ranging from about 20° to about 160°, the first angle measured in a first plane which is substantially vertical and substantially perpendicular to its corresponding wall; and methods wherein each lance is positioned at a second angle ranging from about 20° to about 160°, the second angle measured in a plane substantially perpendicular to the first plane.

Preferably, the remaining portion of air enters the combustion chamber through one or more rectangular slots, or through one or more substantially circular slots.

Preferably, the oxygen-enriched gas is injected in substitution for the remaining portion of air, or the oxygen-enriched gas is injected into the remaining portion of air.

A third aspect of the invention is a method of increasing combustion of a hydrocarbon in a combustion chamber of a furnace, the combustion normally using only air as an oxidant, part of the air entering the combustion chamber near (preferably in) one or more fuel burners in a first zone of the combustion chamber, and a remaining portion of air normally entering the combustion chamber at a plurality of downstream locations, the method comprising injecting a first portion of oxygen-enriched gas into the combustion chamber at the plurality of downstream locations, the first portion of oxygen-enriched gas injected at a velocity ranging from subsonic to supersonic, wherein the first portion of oxygen-enriched gas is injected through a centrally located oxygen lance, which injects the oxygen-enriched gas into a flame created at each of the plurality of locations by a second portion of oxygen-enriched gas and a fuel. Preferably, the totality of oxygen-enriched gas is injected at an amount sufficient to provide an oxygen concentration of no more than 2% greater than when air is used alone.

As with the previous aspects of the invention, the first portion of oxygen-enhanced gas may be either injected at sub-sonic or supersonic velocity, but in all cases, greater velocity than if air were used alone.

Preferred are methods wherein said second fuel is selected from the group consisting of gaseous and liquid fuels, and wherein the second portion of the oxygen-enriched gas has substantially the same concentration of oxygen as the first portion of oxygen-enriched gas; also preferred is when each lance is positioned at a first angle ranging from about 20° to about 160°, the first angle measured in a first plane which is substantially vertical and substantially perpendicular to its corresponding wall.

BRIEF DESCRIPTION OF THE DRAWINGS

FIG. 3 is a schematic illustration of an inventive apparatus and method, illustrating mixing between unburned fuel and oxidant entering from Zone II;

FIGS. 4a and 4b are side sectional and front elevation views, respectively, of one inventive apparatus and method in accordance with the invention;

FIGS. 5a and 5b are side sectional and front elevation views, respectively, of a second apparatus and method embodiment in accordance with the present invention;

FIGS. 6a and 6b are side sectional and front elevation views, respectively, of another apparatus and method embodiment in accordance with the present invention;

FIG. 8 is a plan view of another apparatus and method embodiment in accordance with the present invention;

FIGS. 9a, 9b, and 9c, are side sectional, and two alternative front elevation views, respectively, of another apparatus and method in accordance with the invention;

DESCRIPTION OF PREFERRED EMBODIMENTS

Figure 1:
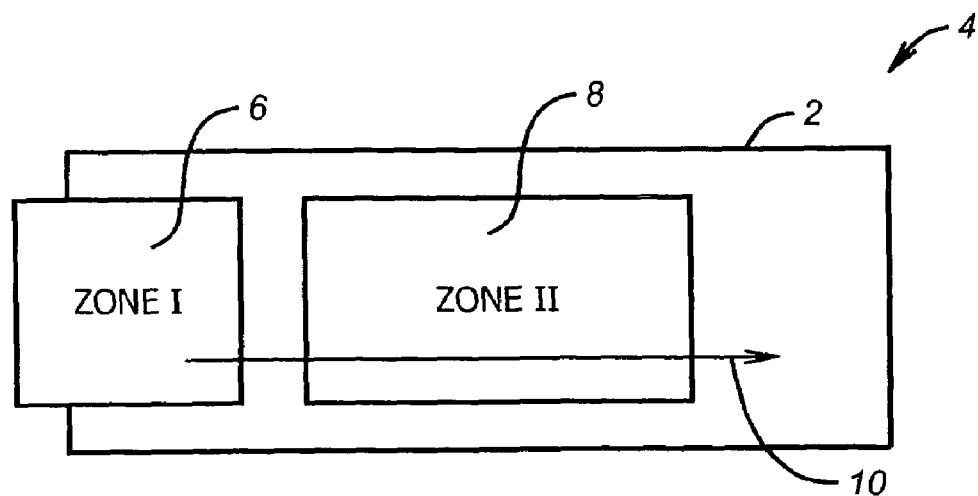
FIG. 1 is a schematic representation of a prior art combustion furnace and method.
Figure 2:
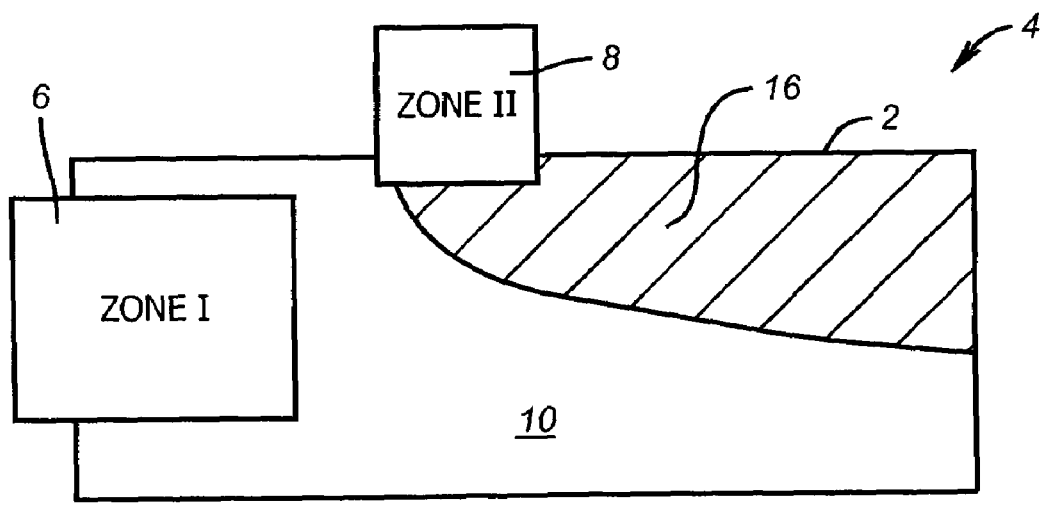
FIG. 2 is a schematic diagram of a prior art combustion furnace and method showing poor mixing between fuel and oxidant injected in Zone II.

The combined effect of enhanced oxygen concentration and improved mixing leads to a more effective and complete fuel combustion. FIG. 3 illustrates the process schematically where the enhanced oxidant is injected in Zone II at 8, forming an enriched oxidant mixing zone 14 which greatly improves the combustion efficiency. FIGS. 4–12 illustrate specific embodiments of injection of oxygen-enriched gas.

FIG. 4a illustrates a side sectional view, and a front elevation view, FIG. 4b, of one apparatus and method embodiment of the invention. A furnace wall or burner block 300 has a front face 302 which faces a combustion chamber. Oxygen-enriched oxidant enters into pipe 301 and traverses through a converging, diverging nozzle 200, having an exit 201. As illustrated in FIG. 4b, there typically are multiple pipes 301 having exits 201, FIG. 4b illustrating a case where there are three pipes 301 and three exits 201. The injection points are located preferably on the same wall of the combustion chamber and separated from the air injection points. The velocity ($V_{OX}$) of the oxygen-enriched oxidant stream (400) is preferably within the range of 0.75 Mach up to about 5 Mach, and more preferably ranging from about Mach 1 to about Mach 2. The high momentum oxidant jet 400 entrains flue gases as depicted in FIG. 4a to create a mixing zone 401. The high momentum oxidant jet entrains flue gases rich in fuel into a high oxygen concentration zone to complete combustion. Typically, if $V_S$ is the sonic velocity of the main oxidant stream in the conditions of use in the furnace, then the following condition will be present with the oxidant stream 400: $V_S < V_{OX} \leq 2 \times V_S$. Also depicted in FIG. 4a is the angle α. Alpha is defined as the angle between the oxidant pipe 301 symmetry axis and the combustion wall 300. Preferably, α ranges from about 20° to about 160°, more preferably from about 45° to about 135°.

FIGS. 5a and 5b illustrate another embodiment of the invention where oxygen-enriched oxidant is injected in pipe 100 in Zone II of the combustion chamber using the same configuration described in FIG. 4a; however, the oxidant stream velocity exiting pipe 100 is below sonic velocity of the local air stream. Thus, in this embodiment, the following relationship exists: $0.1 \times V_S < V_{OX} \leq V_S$. The oxidant exiting pipe 100 is shown at 400a, which mixes with flue gases at 401a as shown in FIG. 5a. Front elevation view "B" is depicted in FIG. 5b and shows three subsonic oxygen-enriched streams emanating from combustion wall 300 through exits 201a. Mixing and penetration/entrainment is not expected to be as effective in this embodiment, but this embodiment might be useful with small combustion chambers.

Another embodiment is depicted in FIGS. 6a and 6b. As depicted in FIG. 6a, a first portion of oxygen-enriched oxidant enters pipe or conduit 100, producing an oxidant stream 400b. The oxidant exiting pipe 100 is subsonic in velocity following the relationship: $V_{OX} \leq 2 \times V_S$. A fuel is injected into pipe 110, or rather into the annular region between pipe 100 and outer pipe 110. An oxygen-enriched oxidant, having the same composition as injected in pipe 100, is injected in the annular region between pipe 110 and a third pipe 120. Fuel emanates from pipe 110 and mixes with oxidant from pipe 120 to create a flame which creates local high temperature zones within which the high concentration of oxygen will be provided to promote a quick and complete combustion on the flue gases (rich in unburned fuel gases) entrained into these regions, such as depicted at 800 in FIG. 6a. The angle α is within the range as depicted for FIG. 4a. A front elevation view is depicted in FIG. 6b, shown from the direction "C" in FIG. 6a. The front elevation view in FIG. 6b depicts three injector pipes 100, three fuel pipes 110, and three outer oxidant injector pipes 120. As with the previous embodiments, the injection points are preferably located on the same wall of the combustion chamber and preferably separated from the air injection points by distance ranging from a few meters up to about 50 meters, depending on the combustion chamber and furnace dimensions.

Figure 7A:
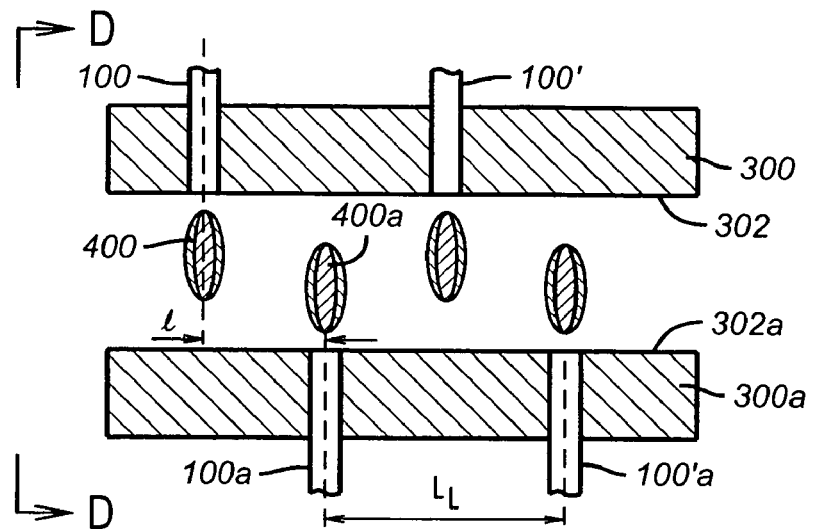
FIGS. 7a and 7b are plan and side sectional views, respectively, of another apparatus and method in accordance with the present invention.
Figure 7B:
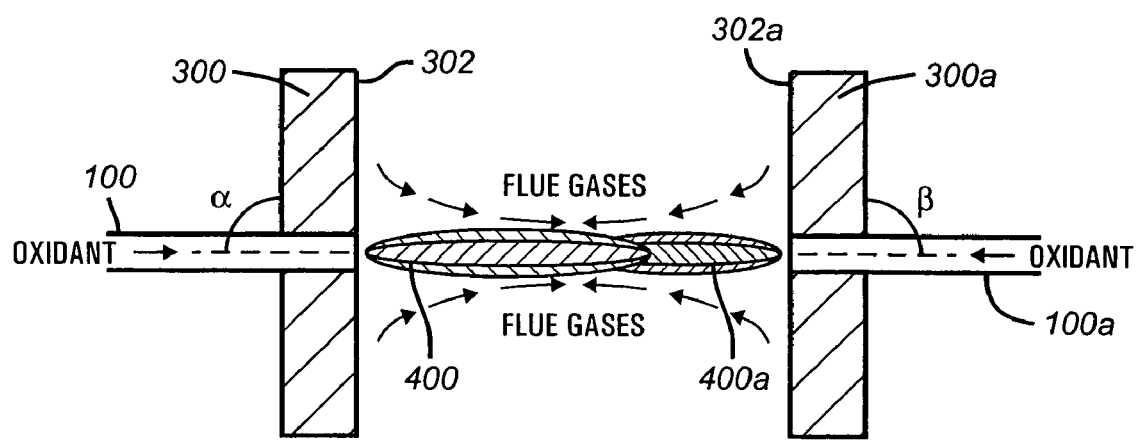

FIGS. 7a and 7b present plan and side sectional views, respectively, of another embodiment of the present invention. In this embodiment, four oxidant lances are installed on two opposing walls of a combustion chamber to provide a more homogenous oxidant distribution within the combustion chamber. Four injection points 100, 100', 100a, and 100a' are provided. Velocity of the oxidant streams injected in these four injectors may range from 0.75 Mach up to Mach 5, preferably ranging from 0.7 Mach to Mach 3. The angle α is as before with regard to previous embodiments, while the angle β as depicted in FIG. 7b is generally within the range of 20° to about 160°. The angle β may be different from the angle α but is preferably the same as the angle α. Illustrated in FIG. 7a is the distance $L_L$ and the distance 1.

$L_L$ is defined as the distance between two adjacent oxidant lances, for example, 100a and 100a' in FIG. 7a. Preferably the following relationship exists: $L_L < L_{CH} \div 2$ where $L_{CH}$ represents a length, width or height of the combustion chamber. Furthermore, 1 is defined as the distance between two opposite lances, and the following relationship holds true: $0 < 1 < L_L \div 2$.

FIG. 8 illustrates another embodiment of oxygen-enriched oxidant injected in Zone II of a combustion chamber. In this embodiment, the oxidant lances 100, 100a, 100b, and 100c are installed on four walls of a combustion chamber 300, 300a, 300b, and 300c, respectively. This embodiment provides a more homogenous and turbulent oxidant distribution. FIG. 8 illustrates a rectangular combustion chamber, but the same injection arrangement could be applied in a cylindrical combustion chamber. The velocities of the various oxidant streams emanating from lances 100, 100a, 100b, and 100c may be the same or different, but in each case the following relationship holds: $V_{OX} \leq 2 \times V_S$, where $V_S$ is the sonic velocity of the primary oxidant stream (usually air) in the conditions of use. The oxygen-enriched zone is indicated in FIG. 8 at 400, 400a, 400b, and 400c. The angle α of each individual oxidant lance 100, 100a, 100b, and 100c, again independently ranges from about 20° to about 160°. Again, α is defined as the angle between the oxidant lance symmetry axis and the combustion wall surface. Another angle is defined in FIG. 8a, angle γ, there being shown $γ_1$, $γ_2$, $γ_3$, and $γ_4$. Angle 8 is defined as the angle between the oxidant lance symmetry axis and the combustion wall surface in a plane perpendicular to which the angle α is measured. The angle γ in each independent case ranges from about 20° to about 160°. There is also defined in FIG. 8 lengths $L_1$, $L_2$, $L_3$, and $L_4$. The length $L_i$ is the distance between the respective oxidant lance and its closest wall surface, with the following relationship holding true: $L_i < L_{CH} \div 2$, where $L_{CH}$ represents a length or width of the combustion chamber.

FIGS. 9a, 9b, and 9c, illustrate schematically a side sectional view, and two alternative front elevation views depicted by front elevation "E" in FIG. 9a. In FIG. 9a, oxygen-enriched oxidant enters a pipe 100, wherein the oxygen-enriched gas is injected directly into an air stream traversing through through-hole 500 in furnace wall 300. Oxygen-enriched gas traverses through pipe 100 and through a converging, diverging nozzle 200 and exits with supersonic velocity ranging from about 1 Mach up to about 5 Mach, preferably from about 1 Mach to about 3 Mach. The high momentum oxidant jet 400 entrains air and flue gases rich in fuel into a high oxygen concentration zone to complete combustion. Depicted in FIGS. 9b and 9c are two alternative front elevation views, which differ primarily in the shape of the through-hole for air. In FIG. 9b, through-hole 500 is a slot, whereas in FIG. 9c, the through-hole 500a is a circular pattern.

Figure 10A:
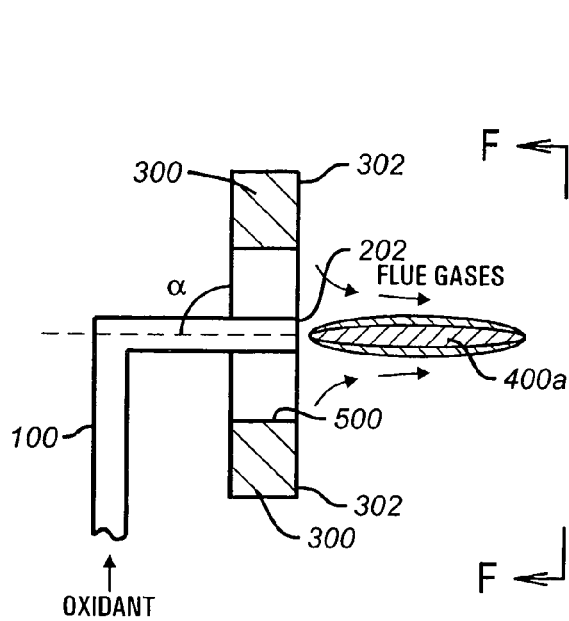
FIGS. 10a, 10b, and 10c, are side sectional, and two alternative front elevation views, respectively, of another apparatus and method in accordance with the present invention.
Figure 10B:
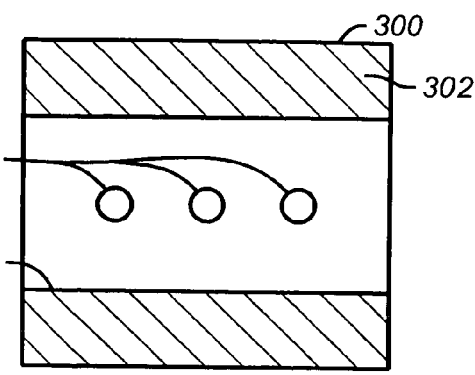
Figure 10C:
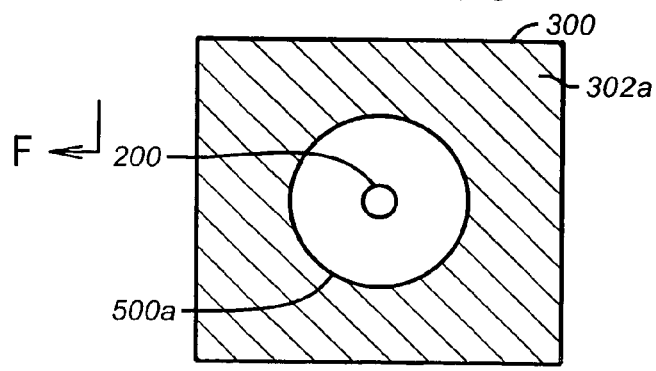

FIGS. 10a, 10b, and 10c, show a design similar to that depicted previously in FIGS. 9a, 9b, and 9c, except that the oxidant-enriched gas emanating from pipe 100 travels through a straight nozzle 202, and therefore, $V_{OX}$ follows the relationship: $0.1 \times V_S < V_{OX} \leq V_S$, where $V_{OX}$ is the oxygen-enriched stream velocity through exit 202, and $V_S$ is the velocity of the air traversing through through-hole 500. FIGS. 10b and 10c, respectively, again show slot and circular air through-holes through furnace wall 300. The angle α again may range from 20° to about 160°.

Figure 11A:
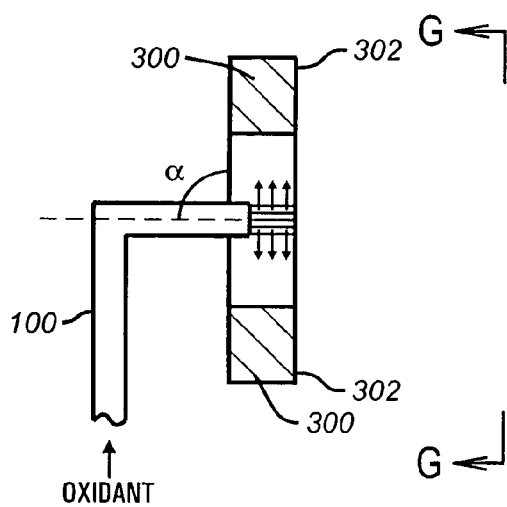
FIGS. 11a, 11b, and 11c, are side sectional, and two alternative front elevation views, respectively, of another apparatus and method embodiment in accordance with the present invention.
Figure 11B:
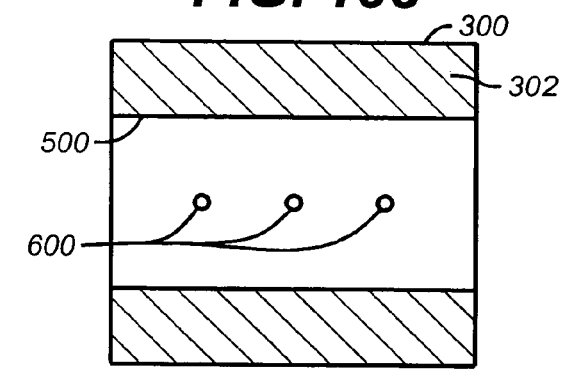
Figure 11C:
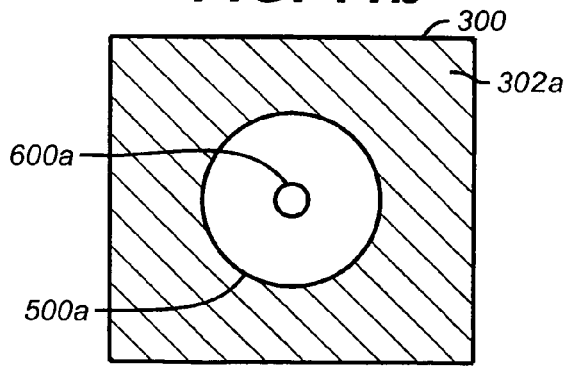

FIGS. 11a, 11b, and 11c, illustrate yet another embodiment of the invention. In FIG. 11a, oxidant enters through a pipe 100 directly into an air stream which traverses through a through-hole 500 in furnace wall 300. Oxygen-enriched stream flowing through pipe 100 is injected perpendicularly (as illustrated via arrows) to the flow of air through a nozzle 600. The oxygen-enriched gas, being injected perpendicular to the flow of air, improves the mixing of air with the high oxygen concentration gas. The velocity of the injected oxygen-enriched stream follows the following relationship: $0.1 \times V_S < V_{OX} < V_S$. The angle α between the oxidant lance symmetry axis and the combustion wall surface ranges from about 20° to about 160°. FIG. 11b illustrates one front elevation view where the air flows through a slot 500, and FIG. 11c illustrates an embodiment to where air flows through a circular through-hole 500a.

Figure 12A:
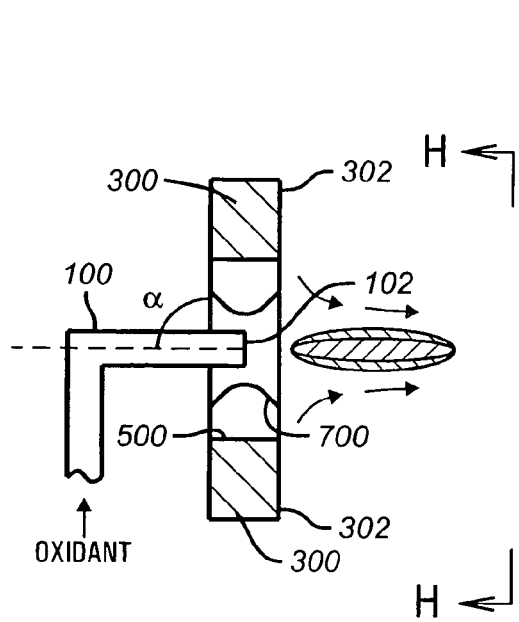
FIGS. 12a, 12b, and 12c, are side sectional, and two alternative front elevation views, respectively, of another apparatus and method embodiment in accordance with the present invention.
Figure 12B:
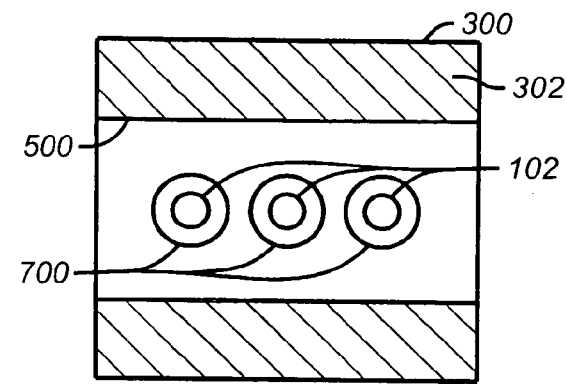
Figure 12C:
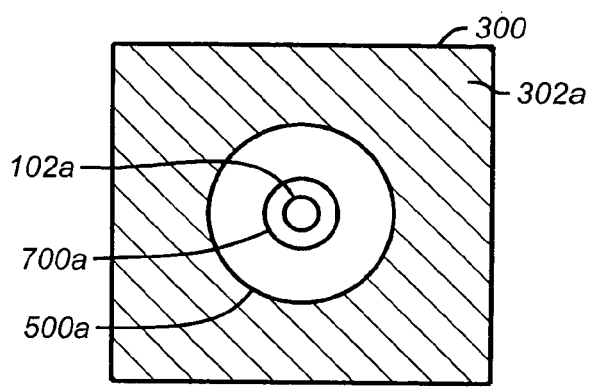

FIGS. 12a, 12b, and 12c illustrate yet another embodiment of the apparatus of the invention wherein oxidant-enriched gas is injected in Zone II of the combustion chamber. In this embodiment, the oxidant is used as the driving fluid while injected into an ejector through a pipe 100 having a pipe exit 102. The oxidant is preferably injected through multiple ejectors, in order to improve the mixing between air and the high-oxygen concentration gas, and also to extend the high oxygen concentration zone further into the combustion chamber. An ejector nozzle 700 is provided for this purpose. The velocity of the oxygen-enriched stream ($V_{OX}$) may be sonic or subsonic, following the relationship: $0.1 \times V_S < V_{OX} < V_S$, where $V_S$ is the sonic velocity of the air stream in the conditions of use. As illustrated in FIG. 12a, view "H," is presented in FIGS. 12b and 12c, as front elevation views. Front elevation view 12b shows three oxygen-enriched gas injectors 102 with respective three ejectors 700. A slot duct 500 is presented for the air passage. FIG. 12c presents an alternative embodiment wherein all of the oxygen-enriched gas is delivered through a single pipe 100 having pipe tip 102a, and a single ejector 700a is presented. Further, a single air passage 500a is presented in furnace wall 300. The angle α preferably ranges from about 20° to about 160°, more preferably ranging from about 45° to about 135°, and more preferably for this embodiment ranges from about 85° to about 95°.

Figure 13:
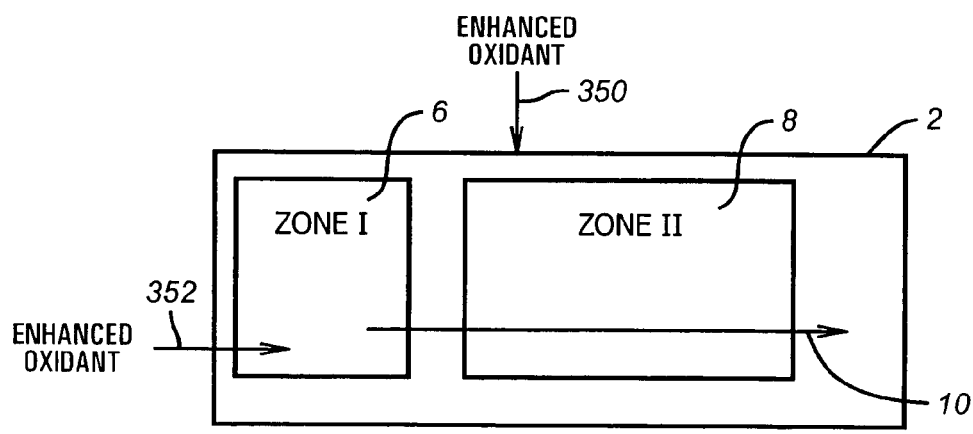
FIG. 13 is a schematic illustration of a preferred apparatus and process in accordance with the invention wherein enhanced oxidant is injected in with the fuel in Zone I.

FIG. 13 illustrates schematically a process and apparatus of the invention where a combined scheme is proposed. Here, enhanced oxidant is introduced both into Zone I, lanced into the fuel stream, and into Zone II, through one of the means described in FIGS. 4–12. Enhanced oxidant is injected at 350 into Zone II and at 352 in Zone I. The impact of the process and apparatus of FIG. 13 is multiple. The enhanced oxidant introduced in Zone I has the role of initiating the combustion process quickly, thus diminishing the role of the support fuel (generally more expensive fuel). The enhanced oxidant injected in Zone II has the role of finishing the combustion process, by providing high grade oxidant in a critical stage of the combustion process. By employing high velocity lances, or ejectors as presented in FIG. 6, the mixing process is dramatically enhanced, thus leading to a more complete combustion.

The ratio between the two streams of enhanced oxidizer is different in the different stages of the boiler operation. Thus, in the beginning, when the combustion chamber is cold, the ignition process is crucial for a quick start up. Thus, a larger proportion of the enhanced oxidant has to be sent through Zone I (up to 100%). After start-up, the balance of enhanced oxidant can be changed, since the conclusion of a combustion process becomes a more important issue. In this stage of the operation, a proportion ranging from 60% to 80% is preferably sent into Zone II, while 20% to 40% is preferably sent through Zone I, for ignition purposes.

Each of said angles α, β and γ, in all embodiments, need not be the same, but range from about 20° to about 160°, more preferably from about 45° to about 135°, and as explained in certain embodiments may have a smaller range, say from 85° to 95°.

In accordance with the invention, the amount of oxygen used in the methods and apparatus of the invention are much smaller than in accordance with the prior art methods. Thus, oxygen-enrichment of less than or equal to 2% by volume is used to both enhance the fuel ignition, and to complete combustion of the fuels used (pulverized coal, fluidized bed, but also natural gas, fuel oil, and the like).

The invention promotes an original injection method in the Zone II of combustion, and also a combination between lancing oxygen-enriched oxidant in Zone I and Zone II, in variable amounts depending on the stage of the combustion operation.

While a variety of embodiments have been presented, the inventors do not anticipate the above embodiments to be exhaustive of the various ways of implementing the methods and apparatus of the invention.

What is claimed is:

1. An improved method of increasing combustion of a hydrocarbon fuel in a combustion chamber of a furnace using only air as an oxidant, comprising introducing part of the air into the combustion chamber near one or more fuel burners where it is combusted with the hydrocarbon fuel thereby creating a flue gas, and introducing a remaining portion of air into the combustion chamber at a first velocity at a plurality of locations downstream of the fuel burners where it is combusted with the flue gas, the improvement comprising:
   a) injecting oxygen-enriched gas in substitution for the remaining portion of air through a plurality of lances into the flue gas at the plurality of downstream locations, the oxygen-enriched gas having an oxygen concentration of no more than 2% greater than that of air, the second velocity being greater than the first velocity.

2. The improved method of claim 1, wherein the second velocity is in the range of 0.75 Mach up to about 5 Mach.

3. The improved method of claim 1, wherein the combustion chamber has four walls nd each of the plurality of lances projects from one of the walls at an angle with respect to that wall in a range of from 20° to 160°.

4. The improved method of claim 1, wherein:
   a) the combustion chamber has four walls;
   b) the combustion chamber has a length, width or height of $L_{CH}$;
   c) each of the plurality of lances on one of the walls is separated by a distance $L_L$; and
   d) $L_L < L_{CH}/2$.

5. The improved method of claim 4, wherein:
   a) half of the plurality of lances are disposed on a first wall of the combustion chamber;
   b) half of the plurality of lances are disposed on a second wall opposing the first wall;
   c) the lances on the first wall are positioned a distance 1 from the lances on the second wall, wherein $0<1<L_L/2$, wherein $L_L$ is the distance between lances on said first wall.

6. The improved method of claim 1, wherein the hydrocarbon fuel is pulverized coal.

7. The improved method of claim 1, wherein the hydrocarbon fuel is natural gas.

8. The improved method of claim 1, wherein the hydrocarbon fuel is fuel oil.

9. An improved method of increasing combustion of a hydrocarbon fuel in a combustion chamber of a furnace using only air as an oxidant, comprising introducing part of the air into the combustion chamber near one or more fuel burners where it is combusted with the hydrocarbon fuel thereby creating a flue gas, and introducing a remaining portion of air into the combustion chamber at a first velocity at a plurality of locations downstream of the fuel burners where it is combusted with the flue gas, the improvement comprising:
   a) reducing the remaining portion of air introduced into the flue gas at the plurality of locations; and
   b) injecting oxygen-enriched gas into the reduced remaining portion of air through a plurality of lances into the flue gas at the plurality of downstream locations, the oxygen-enriched gas being injected in an amount at a second velocity sufficient to provide an oxygen concentration in the combined flue gas, reduced remaining portion of air, and oxygen enriched gas of no more than 2% greater than that of air, the second velocity being greater than the first velocity.

10. The improved method of claim 9, wherein the second velocity is in the range of 0.75 Mach up to about 5 Mach.

11. The improved method of claim 9, wherein the combustion chamber has four walls and each of the plurality of lances projects from one of the walls at an angle with respect to that wall in a range of from 20° to 160°.

12. The improved method of claim 9, wherein:
   a) the combustion chamber has four walls;
   b) the combustion chamber has a length, width or height of $L_{CH}$;
   c) each of the plurality of lances on one of the walls is separated by a distance $L_L$; and
   d) $L_L < L_{CH}/2$.

13. The improved method of claim 12, wherein:
   a) half of the plurality of lances are disposed on a first wall of the combustion chamber;
   b) half of the plurality of lances are disposed on a second wall opposing the first wall;
   c) the lances on the first wall are positioned a distance 1 from the lances on the second wall, wherein $0<1<L_L/2$, wherein $L_L$ is the distance between lances on said first wall.

14. The improved method of claim 9, wherein the hydrocarbon fuel is pulverized coal.

15. The improved method of claim 9, wherein the hydrocarbon fuel is natural gas.

16. The improved method of claim 9, wherein the hydrocarbon fuel is fuel oil.

17. An improved method of increasing combustion of a first hydrocarbon fuel in a combustion chamber of a furnace using only air as an oxidant, comprising introducing part of the air into the combustion chamber near one or more fuel burners where it is combusted with the hydrocarbon fuel thereby creating a flue gas, and introducing a remaining portion of air into the combustion chamber at a first velocity at a plurality of locations downstream of the fuel burners where it is combusted with the flue gas, the improvement comprising:
   a) combusting a portion of an oxygen enriched gas with a second hydrocarbon fuel at the plurality of locations thereby creating a flame at each of the plurality of locations, the oxygen enriched gas having an oxygen concentration of no more Than 2% greater than that of air; and
   b) injecting another portion of oxygen enriched gas into each of the flames through associated lances each of which is centrally located with respect to the associated flames, wherein the first and second hydrocarbon fuels are the same or different.

18. The improved method of claim 17, wherein the second velocity is in the range of 0.75 Mach up to about 5 Mach.

19. The improved method of claim 17, wherein the combustion chamber has four walls and each of the plurality of lances projects from one of the walls at an angle with respect to that wall in a range of from 20° to 160°.

20. The improved method of claim 17, wherein:
a) the combustion chamber has four walls;
b) the combustion chamber has a length, width or height of $L_{CH}$;
c) each of the plurality of lances on one of the walls is separated by a distance $L_L$; and
d) $L_L < L_{CH}/2$.

21. The improved method of claim 20, wherein:
a) half of the plurality of lances are disposed on a first wall of the combustion chamber;
b) half of the plurality of lances are disposed on a second wall opposing the first wall;
c) the lances on the first wall are positioned a distance 1 from the lances on the second wall, wherein $0 < 1 < L_L/2$, wherein $L_L$ is the distance between lances on said first wall.

22. The improved method of claim 17, wherein the first hydrocarbon fuel is pulverized coal.

23. The improved method of claim 17, wherein the first hydrocarbon fuel is natural gas.

24. The improved method of claim 17, wherein the first hydrocarbon fuel is fuel oil.

* * * * *